(12) United States Patent
Wu et al.

(10) Patent No.: US 11,258,246 B2
(45) Date of Patent: Feb. 22, 2022

(54) GROUND FAULT CIRCUIT INTERRUPTER WITH SELF TEST

(71) Applicant: Shanghai Fudan Microelectronics Group Company Limited, Shanghai (CN)

(72) Inventors: Chunyong Wu, Shanghai (CN); Lei Shen, Shanghai (CN); Jiwen Gong, Shanghai (CN); Yang Liu, Shanghai (CN); Shusen Hao, Shanghai (CN)

(73) Assignee: Shanghai Fudan Microelectronics Group Company Limited, Shanghai (CN)

( * ) Notice: Subject to any disclaimer, the term of this patent is extended or adjusted under 35 U.S.C. 154(b) by 0 days.

(21) Appl. No.: 16/853,346

(22) Filed: Apr. 20, 2020

(65) Prior Publication Data
US 2020/0350757 A1 Nov. 5, 2020

(51) Int. Cl.
*H02H 3/16* (2006.01)
*H02H 1/00* (2006.01)
*H02H 3/05* (2006.01)

(52) U.S. Cl.
CPC .......... *H02H 3/162* (2013.01); *H02H 1/0007* (2013.01); *H02H 3/05* (2013.01)

(58) Field of Classification Search
CPC ...... G01R 31/42; H01H 83/04; H01H 83/144; H02H 1/0007; H02H 3/044; H02H 3/05; H02H 3/08; H02H 3/162; H02H 3/32; H02H 3/33; H02H 3/334; H02H 3/335; H02H 3/44
See application file for complete search history.

(56) References Cited

U.S. PATENT DOCUMENTS 6,262,871 B1 * 7/2001 Nemir .................. G01R 31/327
  324/424
8,018,697 B2 * 9/2011 Ward ....................... H02H 3/33
  361/42

(Continued)

FOREIGN PATENT DOCUMENTS

CN       203632214 U  *  6/2014
WO   WO-2013166388 A1 * 11/2013  ............. H02H 3/335

*Primary Examiner* — Jared Fureman
*Assistant Examiner* — Nicolas Bellido
(74) *Attorney, Agent, or Firm* — Harness, Dickey & Pierce, P.L.C.

(57) ABSTRACT

Ground fault circuit interrupter is provided, including a transformer, a protection switch, a residual current protection control unit, a residual current simulation unit and a self-test unit, wherein the self-test unit is coupled with the line where the protection switch is located; in a self-test state, the self-test unit is configured to control the residual current simulation unit to generate a simulated residual current, detect a level change on the line where the protection switch is located, and control the protection switch to be disconnected from the residual current protection control unit or to make the line where the protection switch is located be conducted after a preset protection time period of receiving the residual current signal higher than a preset operating threshold. Improper actions of the ground fault circuit interrupter caused by a large electromotive force generated when a simulated residual current disappears are avoided.

18 Claims, 4 Drawing Sheets

(56) References Cited

U.S. PATENT DOCUMENTS

| | | | | |
|---|---|---|---|---|
| 8,232,804 B2* | 7/2012 | Fong | ............... | H02H 3/335 |
| | | | | 324/424 |
| 9,748,760 B2* | 8/2017 | Legatti | ............ | H02H 3/044 |
| 9,800,043 B2* | 10/2017 | Marquez | ........... | H01H 83/04 |
| 2012/0229943 A1* | 9/2012 | Ward | ............ | H02H 3/335 |
| | | | | 361/62 |
| 2014/0009856 A1* | 1/2014 | Ward | ............ | H02H 3/044 |
| | | | | 361/42 |
| 2018/0278040 A1* | 9/2018 | Hao | .............. | H02H 3/335 |
| 2020/0350758 A1* | 11/2020 | Wu | .............. | H02H 1/0007 |

* cited by examiner

GROUND FAULT CIRCUIT INTERRUPTER WITH SELF TEST

CROSS-REFERENCE TO RELATED APPLICATIONS

This application claims the benefit of priority to Chinese Patent Application No. 201910362227.3, filed on Apr. 30, 2019, and entitled "GROUND FAULT CIRCUIT INTERRUPTER WITH SELF TEST", the entire disclosure of which is incorporated herein by reference.

TECHNICAL FIELD

The present disclosure generally relates to circuit field, and more particularly, to a ground fault circuit interrupter.

BACKGROUND

In a power supply system, a ground fault may occur due to various reasons. A ground fault in a line may cause a risk of electric shock for a person who contacts the line. Therefore, it is usually necessary to provide a ground fault circuit interrupter in the power supply system.

To ensure safety of the power supply system, it is necessary to periodically check whether functions of the ground fault circuit interrupter are normal. Therefore, in existing techniques, the ground fault circuit interrupter generally has a self-test function, so that an alarm is generated when a protection function of the ground fault circuit interrupter is abnormal. In some cases, there is a small residual current in power supply lines due to imbalance of a sensing coil, and as a result, the ground fault circuit interrupter may generate a false alarm when a simulated residual current generated by a self-test circuit has an opposite phase with that of the small residual circuit.

To solve the problem of false alarm of the ground fault circuit interrupter, in the existing techniques, when there is a small residual current in the power supply lines due to the imbalance of the sensing coil, a higher simulated residual current needs to be provided. However, the above solutions may cause a protection switch in a ground fault circuit interrupter to improperly open the power supply lines due to a too large induced electromotive force generated by a large simulated residual current when it disappears.

SUMMARY

With embodiments of the present disclosure, improper actions of a ground fault circuit interrupter caused by a large electromotive force generated when a simulated residual current disappears during a self-test process of the ground fault circuit interrupter may be avoided.

In an embodiment, a ground fault circuit interrupter is provided, including a transformer, a protection switch, a residual current protection control unit, a residual current simulation unit and a self-test unit, wherein a first terminal of the protection switch is coupled with power supply lines, and a second terminal of the protection switch is coupled with the residual current protection control unit and the self-test unit; the transformer is coupled with the residual current protection control unit, and configured to sense a residual current signal on the power supply lines and deliver the residual current signal to the residual current protection control unit; the residual current protection control unit is configured to control a line where the protection switch is located to be conducted when the residual current signal is higher than a preset operating threshold; the residual current simulation unit is coupled with the self-test unit; the self-test unit is coupled with the line where the protection switch is located; in a self-test state, the self-test unit is configured to control the residual current simulation unit to generate a simulated residual current, control the protection switch to be disconnected from the residual current protection control unit, and detect a level change on the line where the protection switch is located.

Optionally, the ground fault circuit interrupter further includes a silicon controlled rectifier coupled with the protection switch, wherein a cathode of the silicon controlled rectifier is grounded, an anode of the silicon controlled rectifier is coupled with the second terminal of the protection switch, and a gate of the silicon controlled rectifier is coupled with the residual current protection control unit; wherein when the residual current signal received by the residual current protection control unit is higher than the preset operating threshold, a current or a voltage is applied to the gate of the silicon controlled rectifier to trigger the silicon controlled rectifier.

Optionally, the self-test unit is coupled with the line where the protection switch is located at a first connection point, and configured to detect a phase change of a current or voltage at the first connection point, the first connection point is disposed between the silicon controlled rectifier and the protection switch, and in the self-test state, the self-test unit is configured to detect a level change at the connection point.

Optionally, the power supply lines include a hot and a neutral in a two-phase Alternating Current (AC) power supply system, and the first terminal of the protection switch is coupled with the hot.

Optionally, the residual current simulation unit includes a first residual current simulation line, a second residual current simulation line and a first switch; wherein a first terminal of the first residual current simulation line is coupled with the hot, and a second terminal of the first residual current simulation line is coupled with the second residual current simulation line at a second connection point; wherein a first terminal of the second residual current simulation line is coupled with the neutral, and a second terminal of the second residual current simulation line is coupled with the first residual current simulation line at the second connection point; wherein a first terminal of the first switch is coupled with the second connection point, a second terminal of the first switch is grounded, and a control terminal of the first switch is coupled with the self-test unit.

Optionally, a first diode is provided on the first residual current simulation line, a cathode of the first diode is coupled with the hot, and an anode of the first diode is coupled with the second connection point; and a second diode is provided on the second residual current simulation line, a cathode of the second diode is coupled with the neutral, and an anode of the second diode is coupled with the second connection point.

Optionally, the residual current simulation unit further includes a resistor, a first terminal of the resistor is coupled with the second connection point, and a second terminal of the resistor is coupled with the first terminal of the first switch.

Optionally, the ground fault circuit interrupter further includes a second switch, wherein a first terminal of the second switch is coupled with the second terminal of the protection switch, a second terminal of the second switch is coupled with the first connection point, and a control terminal of the second switch is coupled with the self-test unit.

Optionally, the protection switch is a tripping coil.

In an embodiment, a ground fault circuit interrupter is provided, including a transformer, a protection switch, a residual current protection control unit, a residual current simulation unit and a self-test unit, wherein a first terminal of the protection switch is coupled with power supply lines, and a second terminal of the protection switch is coupled with the residual current protection control unit and the self-test unit; the transformer is coupled with the residual current protection control unit, and configured to sense a residual current signal on the power supply lines and deliver the residual current signal to the residual current protection control unit; the residual current protection control unit is configured to control a line where the protection switch is located to be conducted when the residual current signal is higher than a preset operating threshold; the residual current simulation unit is coupled with the self-test unit; the self-test unit is coupled with the line where the protection switch is located; in a self-test state, the self-test unit is configured to control the residual current simulation unit to generate a simulated residual current, detect a level change on the line where the protection switch is located, and control the residual current protection control unit to make the line where the protection switch is located be conducted after a preset protection time period of receiving the residual current signal higher than the preset operating threshold.

Optionally, the ground fault circuit interrupter further includes a silicon controlled rectifier coupled with the protection switch, wherein a cathode of the silicon controlled rectifier is grounded, an anode of the silicon controlled rectifier is coupled with the second terminal of the protection switch, and a gate of the silicon controlled rectifier is coupled with the residual current protection control unit; wherein when the residual current signal received by the residual current protection control unit is higher than the preset operating threshold, a current or a voltage is applied to the gate of the silicon controlled rectifier to trigger the silicon controlled rectifier.

Optionally, the self-test unit is coupled with the line where the protection switch is located at a first connection point, and configured to detect a phase change of a current or voltage at the first connection point, the first connection point is disposed between the silicon controlled rectifier and the protection switch, and in the self-test state, the self-test unit is configured to detect a level change at the connection point.

Optionally, the power supply lines include a hot and a neutral in a two-phase AC power supply system, and the first terminal of the protection switch is coupled with the hot.

Optionally, the residual current simulation unit includes a first residual current simulation line, a second residual current simulation line and a third switch; wherein a first terminal of the first residual current simulation line is coupled with the hot, and a second terminal of the first residual current simulation line is coupled with the second residual current simulation line at a second connection point; wherein a first terminal of the second residual current simulation line is coupled with the neutral, and a second terminal of the second residual current simulation line is coupled with the first residual current simulation line at the second connection point; wherein a first terminal of the third switch is coupled with the second connection point, a second terminal of the third switch is grounded, and a control terminal of the third switch is coupled with the self-test unit.

Optionally, a first diode is provided on the first residual current simulation line, a cathode of the first diode is coupled with the hot, and an anode of the first diode is coupled with the second connection point; and a second diode is provided on the second residual current simulation line, a cathode of the second diode is coupled with the neutral, and an anode of the second diode is coupled with the second connection point.

Optionally, the residual current simulation unit further includes a resistor, a first terminal of the resistor is coupled with the second connection point, and a second terminal of the resistor is coupled with the first terminal of the third switch.

Optionally, a third diode is provided on the line where the protection switch is located, a cathode of the third diode is coupled with the protection switch, and an anode of the third diode is coupled with the first connection point.

Optionally, the protection switch is a tripping coil.

Compared with the existing techniques, embodiments of the present disclosure may have following advantages. During the self-test of the ground fault circuit interrupter, the connection between the residual current protection control unit and the protection switch is opened, or the residual current protection control unit is controlled to make the line where the protection switch is located be conducted after the protection time period ends, so that the protection switch will not be improperly controlled by the residual current protection control unit. Besides, whether a function of the ground fault circuit interrupter is normal is detected by the self-test unit. The simulated residual current is generated at positive half-cycle and negative half-cycle of an AC power signal by the self-test unit. The simulated residual current could be relatively small. In this way, improper actions of the ground fault circuit interrupter caused by a large electromotive force generated when the simulated residual current disappears during the self-test process of the ground fault circuit interrupter may be avoided.

DETAILED DESCRIPTION

To solve the problem of false alarm of the self-test unit, in the existing techniques, when there is a small residual current on the power supply lines, a higher simulated residual current need to be provided. However, the above solutions may cause a protection switch in a ground fault circuit interrupter to improperly open the power supply lines due to a too large induced electromotive force generated by a large simulated residual current when it disappears.

In embodiments of the present disclosure, during the self-test of the ground fault circuit interrupter, the connection between the residual current protection control unit and the protection switch is opened, or the residual current protection control unit is controlled to make the line where the protection switch is located be conducted after the protection time period ends, so that the protection switch will not be improperly controlled by the residual current protection control unit. Besides, whether the function of the ground fault circuit interrupter is normal is detected by the self-test unit. The simulated residual current could be generated at positive half-cycle and negative half-cycle of an AC power signal by the self-test unit. The simulated residual current could be small. In this way, improper actions of the ground fault circuit interrupter caused by a large electromotive force generated when the simulated residual current disappears during the self-test process of the ground fault circuit interrupter may be avoided.

In order to clarify the object, solutions and advantages of embodiments of the present disclosure, embodiments of present disclosure will be described explicitly in detail in conjunction with accompanying drawings.

Figure 1:
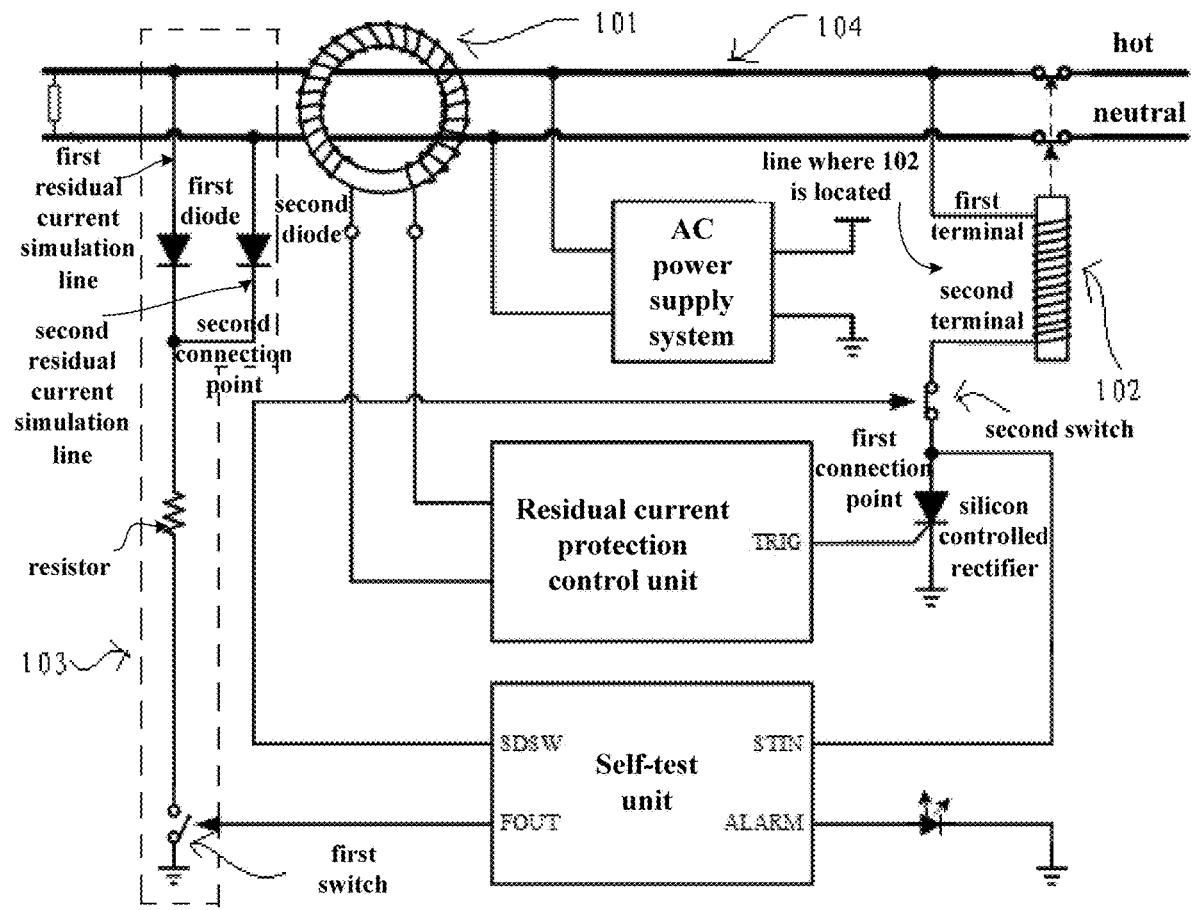
FIG. 1 schematically illustrates a ground fault circuit interrupter according to an embodiment.

Referring to FIG. 1, in an embodiment, a ground fault circuit interrupter is provided. The ground fault circuit interrupter includes a transformer 101, a protection switch 102, a residual current protection control unit, a residual current simulation unit 103 and a self-test unit.

A first terminal of the protection switch 102 is coupled with power supply lines 104, and a second terminal of the protection switch 102 is coupled with the residual current protection control unit and the self-test unit. The protection switch 102 is configured to: when a line where the protection switch 102 is located is controlled to be conducted by the residual current protection control unit, and a current flowing through the line where the protection switch 102 is located is higher than a preset power-off threshold, open a load from an AC power supply system.

The transformer 101 is coupled with the residual current protection control unit, and configured to sense a residual current signal on the power supply lines 104 and deliver the residual current signal to the residual current protection control unit.

The residual current protection control unit is configured to control the line where the protection switch 102 is located to be conducted when the residual current signal is higher than a preset operating threshold.

The residual current simulation unit 103 is coupled with the self-test unit.

The self-test unit is coupled with the line where the protection switch 102 is located. In a self-test state, the self-test unit is configured to control the residual current simulation unit 103 to generate a simulated residual current, control the protection switch 102 to be disconnected from the residual current protection control unit, and detect a level change on the line where the protection switch 102 is located.

In some embodiments, the transformer 101 surrounds the power supply lines 104, and the power supply lines 104 pass through a loop of the transformer 101. During normal operation of the ground fault circuit interrupter, when a residual current flowing through the power supply lines 104 is higher than the preset operating threshold, the residual current protection control unit controls the line where the protection switch 102 is located to be conducted. When the current flowing through the protection switch 102 is higher than the preset power-off threshold, the protection switch 102 opens the load from the AC power supply system.

In some embodiments, both terminals of the transformer 101 may be coupled with the residual current protection control unit.

In some embodiments, specific values of the preset power-off threshold and the preset operating threshold may be determined by users according to practical situations.

In some embodiments, when the ground fault circuit interrupter is in a self-test state, the self-test unit controls the residual current simulation unit 103 to generate a simulated residual current, and controls the protection switch 102 to be disconnected from the residual current protection control unit, so that the residual current protection control unit cannot control the line where the protection switch 102 is located to be conducted. The self-test unit determines whether a function and components of the ground fault circuit interrupter are normal according to the level change on the line where the protection switch 102 is located.

In some embodiments, the residual current simulation unit 103 may generate a simulated residual current on the power supply lines 104.

In some embodiments, the ground fault circuit interrupter further includes a silicon controlled rectifier coupled with the protection switch 102, wherein a cathode of the silicon controlled rectifier is grounded, an anode of the silicon controlled rectifier is coupled with the second terminal of the protection switch 102, and a gate of the silicon controlled rectifier is coupled with the residual current protection control unit. When the residual current signal received by the residual current protection control unit is higher than the preset operating threshold, a current or voltage is applied to the gate of the silicon controlled rectifier to trigger the silicon controlled rectifier.

In some embodiments, after the silicon controlled rectifier is triggered, the silicon controlled rectifier is conducted, a current may flow on the line where the protection switch 102 is located, and a level of the line where the protection switch 102 changes to be low.

In some embodiments, the self-test unit is coupled with the line where the protection switch 102 is located at a first connection point, and configured to detect a phase change of a current or voltage at the first connection point. The first connection point is disposed between the silicon controlled rectifier and the protection switch 102. In the self-test state, the self-test unit is configured to detect a level change at the first connection point.

In some embodiments, when the ground fault circuit interrupter is in the self-test state, the self-test unit operates according to the phase change of the current or voltage at the first connection point and the level change at the first connection point. In some embodiments, the power supply lines 104 include a hot and a neutral in a two-phase AC power supply system, and the first terminal of the protection switch 102 is coupled with the hot.

In some embodiments, when being controlled to be conducted by the residual current protection control unit, the line where the protection switch 102 is located forms a current path from the hot to neutral through the silicon controlled rectifier.

In some embodiments, one port of the power supply lines 104 is coupled with the load, and the other port of the power supply lines 104 is coupled with the AC power supply system.

In some embodiments, when the current flowing through the protection switch 102 is higher than the preset power-off threshold, the protection switch 102 may disconnect the load from the AC power supply system to realize ground fault protection.

In some embodiments, the residual current simulation unit 103 includes a first residual current simulation line, a second residual current simulation line and a first switch. A first terminal of the first residual current simulation line is coupled with the hot, and a second terminal of the first residual current simulation line is coupled with the second residual current simulation line at a second connection point. A first terminal of the second residual current simulation line is coupled with the neutral, and a second terminal of the second residual current simulation line is coupled with the first residual current simulation line at the second connection point. A first terminal of the first switch is coupled with the second connection point, a second terminal of the first switch is grounded, and a control terminal of the first switch is coupled with the self-test unit.

In some embodiments, when the ground fault circuit interrupter is in the self-test state, the self-test unit controls the first switch to be turned on, so that a simulated residual current is generated on the residual current simulation unit 103.

In some embodiments, if the residual current on the power supply lines 104 is in a positive half-cycle of an AC power signal, the self-test unit controls the generation of a simulated residual current on the first residual current simulation line. The AC power signal is a power supply signal output from the AC power supply system.

In some embodiments, if the residual current on the power supply lines 104 is in a negative half-cycle of the AC power signal, the self-test unit controls the generation of a simulated residual current on the second residual current simulation line.

In some embodiments, a first diode is provided on the first residual current simulation line, a cathode of the first diode is coupled with the hot, and an anode of the first diode is coupled with the second connection point. A second diode is provided on the second residual current simulation line, a cathode of the second diode is coupled with the neutral, and an anode of the second diode is coupled with the second connection point.

In some embodiments, the diodes may isolate reverse current.

In some embodiments, the residual current simulation unit 103 further includes a resistor, a first terminal of the resistor is coupled with the second connection point, and a second terminal of the resistor is coupled with the first terminal of the first switch.

In some embodiments, the ground fault circuit interrupter further includes a second switch, wherein a first terminal of the second switch is coupled with the second terminal of the protection switch 102, a second terminal of the second switch 102 is coupled with the first connection point, and a control terminal of the second switch 102 is coupled with the self-test unit.

In some embodiments, when the ground fault circuit interrupter works normally, the second switch is in an on state. When the residual current protection control unit receives the residual current signal that is higher than the preset operating threshold, the residual current protection control unit may apply a current or a voltage to the gate of the silicon controlled rectifier, so that the line where the protection switch 102 is located is conducted, and a load is opened from the AC power supply system.

Figure 2:
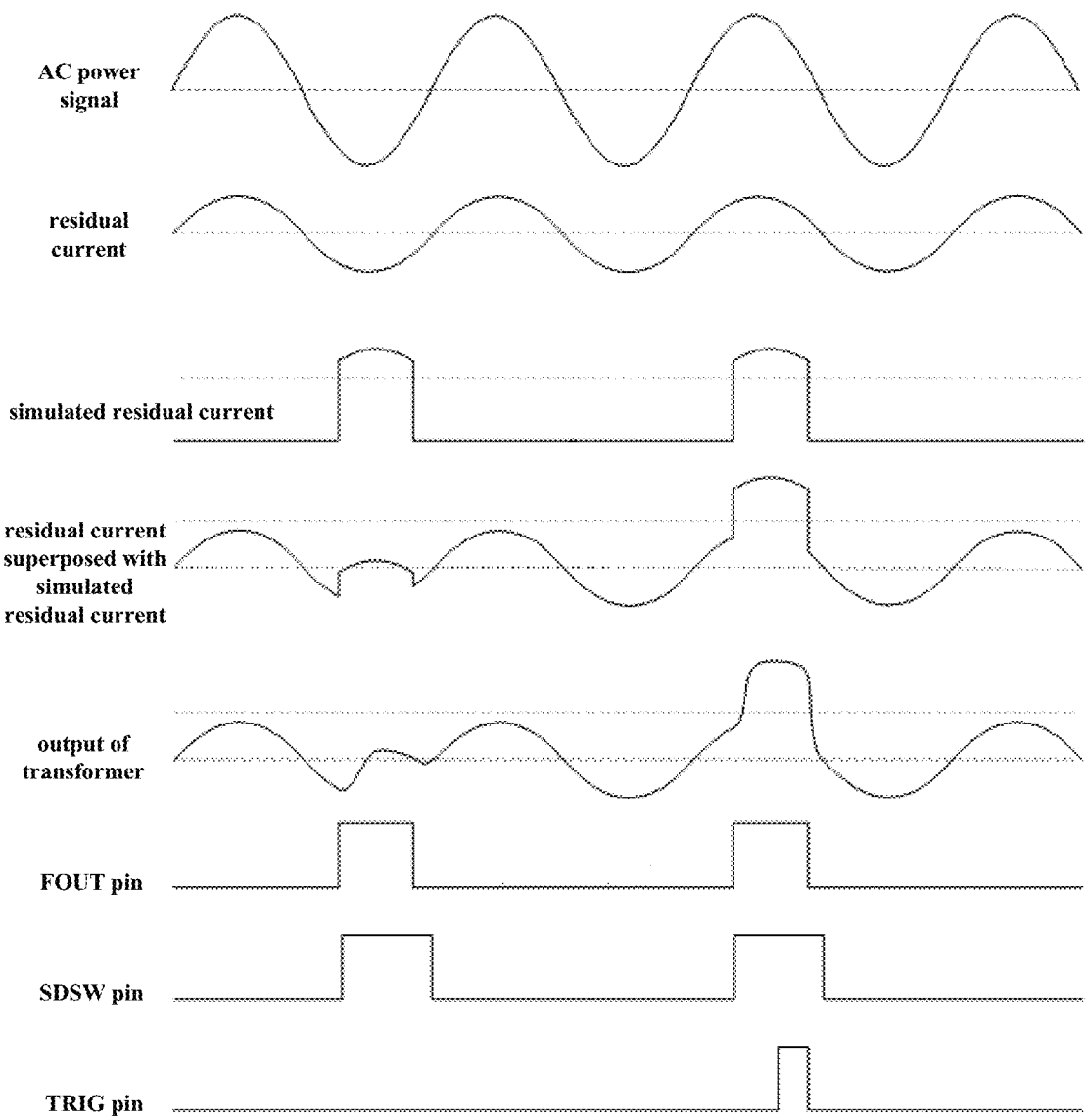
FIG. 2 schematically illustrates waveforms associated with the ground fault circuit interrupter as shown in FIG. 1.

Referring to FIG. 2, in some embodiments, when the ground fault circuit interrupter is in a self-test state, an SDSW pin of the self-test unit is pulled up to make the second switch be turned off, and an FOUT pin is pulled up to control the first switch to be turned on, so that the residual current simulation unit 103 generates a simulated residual current.

In some embodiments, when there is a small residual current on the power supply lines 104 due to imbalance of a sensing coil, in a negative half-cycle of the AC power signal, the self-test unit controls the second residual current simulation line to generate a simulated residual current on the neutral. The simulated residual current and the small residual current on the power supply lines 104 due to the imbalance of the sensing coil may have opposite directions, and cancel each other. Therefore, no residual current signal is generated on the transformer 101, or there is merely a residual current signal lower than the preset operating threshold.

In some embodiments, when a voltage of the hot on the power supply lines 104 is in a positive half-cycle, the self-test unit controls the first residual current simulation line to generate a simulated residual current on the hot. The simulated residual current on the hot and the small residual current on the power supply lines 104 due to the imbalance of the sensing coil should have same directions, and are superimposed, which causes the transformer 101 to deliver a large residual current signal to the residual current protection control unit, and further causes the residual current protection control unit to trigger the silicon controlled rectifier by pulling a TRIG pin up. Further, as the second switch is turned off, no current flows through the protection switch 102, the protection switch 102 cannot improperly open the load from the AC power supply system. Further, as the anode of the silicon controlled rectifier is grounded, the level at the first connection point becomes low.

In some embodiments, the positive half-cycle of the AC power signal of generating the simulated residual current on the first residual current simulation line and the negative half-cycle of the AC power signal of generating the simulated residual current on the second residual current simulation line may be within one cycle, or may be separated by multiple cycles, which may be set by users according to specific situations.

In some embodiments, the self-test is performed in both the positive half-cycle and the negative half-cycle. In case there is a small residual current, in the negative half-cycle, the simulated residual current and the residual current on the power supply lines 104 have opposite directions and cancel each other, and no effective residual current signal can be generated to determine whether the ground fault circuit interrupter works normally, however, in the positive half-cycle, the simulated residual current and the residual current on the power supply lines 104 have the same direction, and an effective residual current signal can be generated to determine whether the ground fault circuit interrupter works normally. Therefore, the simulated residual current may be relatively low, and an induced electromotive force generated by the simulated residual current may be relatively small, which will not cause an improper action of the ground fault circuit interrupter.

In some embodiments, the self-test unit may determine that a phase of the current or voltage on the first connection point changes when a zero-crossing point is detected on the phase of the current at the first connection point.

In some embodiments, if the self-test unit detects a phase change of the voltage at the first connection point, and the level becomes low within the positive half-cycle of generating the simulated residual current on the first residual current simulation line, it is indicated that the function and the components of the ground fault circuit interrupter are normal.

In some embodiments, if the self-test unit does not detect a phase change of the voltage at the first connection point or does not detect that the first connection point changes from a logic high to a logic low in the self-test state, an ALARM pin of the self-test unit controls a light emitting diode to generate an alarm signal.

In some embodiments, the protection switch 102 is a tripping coil.

Figure 3:
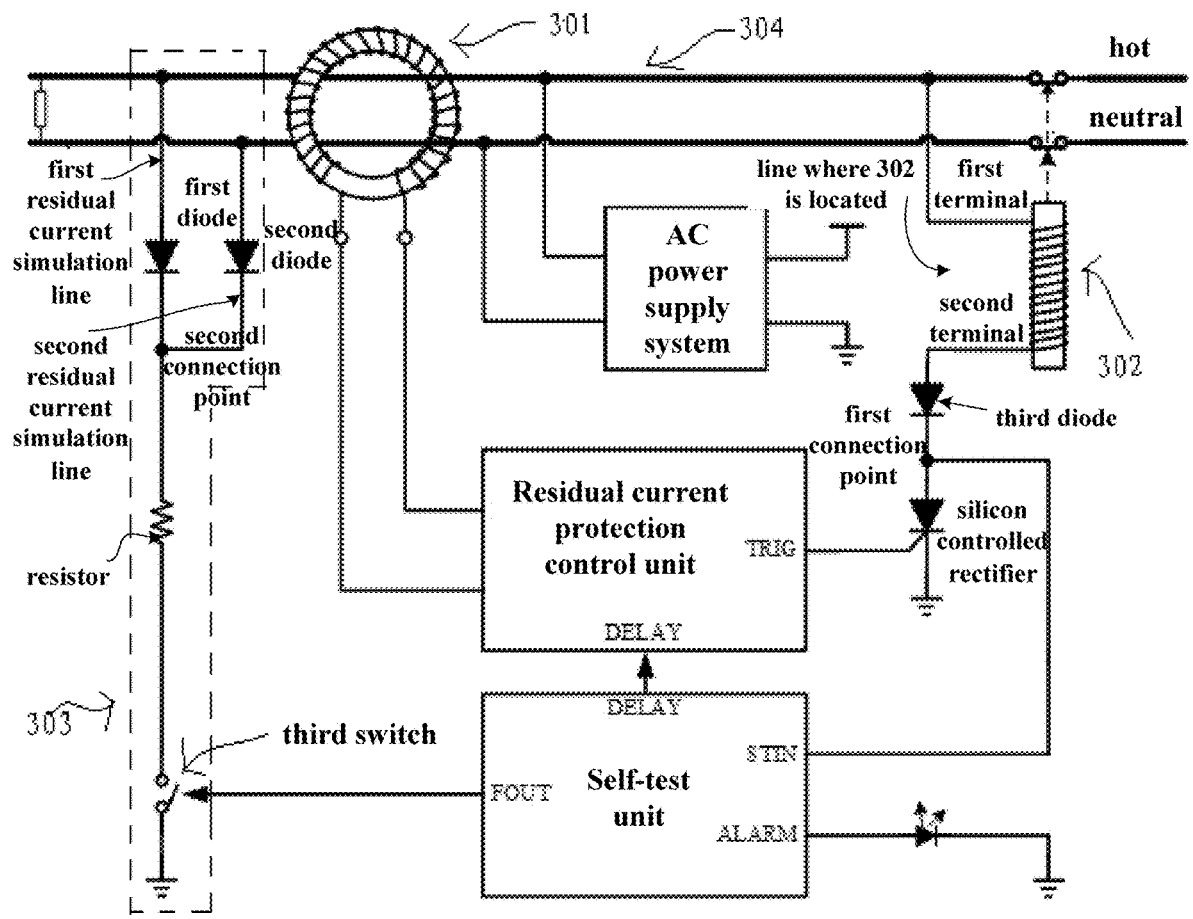
FIG. 3 schematically illustrates a ground fault circuit interrupter according to an embodiment.

Referring to FIG. 3, in an embodiment, another ground fault circuit interrupter is provided. The ground fault circuit interrupter includes a transformer 301, a protection switch 302, a residual current protection control unit, a residual current simulation unit 303 and a self-test unit.

A first terminal of the protection switch 302 is coupled with power supply lines 304, and a second terminal of the protection switch 302 is coupled with the residual current protection control unit and the self-test unit. The protection switch 302 is configured to: when a current flowing through a line where the protection switch 302 is located is higher than a preset power-off threshold, open the load from the AC power supply system.

The transformer 301 is coupled with the residual current protection control unit, and configured to sense a residual current signal on the power supply lines 304 and deliver the residual current signal to the residual current protection control unit.

The residual current protection control unit is configured to control the line where the protection switch 302 is located to be conducted when the residual current signal is higher than a preset operating threshold.

The residual current simulation unit 303 is coupled with the self-test unit.

The self-test unit is coupled with the line where the protection switch 302 is located. In a self-test state, the self-test unit is configured to control the residual current simulation unit 303 to generate a simulated residual current, detect a level change on the line where the protection switch 302 is located, and control the residual current protection control unit to make the line where the protection switch 302 is located be conducted after a preset protection time period of the residual current signal being higher than the preset operating threshold.

In some embodiments, the transformer 301 surrounds the power supply lines 304, and the power supply lines 304 pass through a loop of the transformer 301. During normal operation of the ground fault circuit interrupter, when a residual current flows through the power supply lines 304, the transformer 301 generates and delivers a residual current signal to the residual current protection control unit which then controls the line where the protection switch 302 is located to be conducted. When the current flowing through the protection switch 302 is higher than the preset power-off threshold, the protection switch 302 opens the load from the AC power supply system.

In some embodiments, both terminals of the transformer 301 may be coupled with the residual current protection control unit.

In some embodiments, specific values of the preset power-off threshold and the preset operating threshold may be determined by users according to practical situations.

In some embodiments, when the ground fault circuit interrupter is in a self-test state, and a phase change of the current or voltage on the line where the protection switch 302 is located is detected, the self-test unit controls the residual current simulation unit 303 to generate a simulated residual current, and controls the residual current protection control unit to make the line where the protection switch 302 is located be conducted after a preset protection time period, so that no current or merely a current lower than the power-off threshold flows through the line where the protection switch 302 is located when the line is conducted. The self-test unit determines whether a function and components of the ground fault circuit interrupter are normal according to the level change on the line where the protection switch 302 is located.

In some embodiments, the residual current simulation unit 303 may generate a simulated residual current on the power supply lines 304.

In some embodiments, the ground fault circuit interrupter further includes a silicon controlled rectifier coupled with the protection switch 302, wherein a cathode of the silicon controlled rectifier is grounded, an anode of the silicon controlled rectifier is coupled with the second terminal of the protection switch 302, and a gate of the silicon controlled rectifier is coupled with the residual current protection control unit. When the residual current signal received by the residual current protection control unit is higher than the preset operating threshold, a current or a voltage is applied to the gate of the silicon controlled rectifier to trigger the silicon controlled rectifier.

In some embodiments, after being triggered, the silicon controlled rectifier is conducted, a current may flow on the line where the protection switch 302 is located, and a level of the second terminal of the protection switch 302 changes to be low.

In some embodiments, the self-test unit is coupled with the line where the protection switch 302 is located at a first connection point, and configured to detect a phase change of a current or voltage at the first connection point. The first connection point is disposed between the silicon controlled rectifier and the protection switch 302. In the self-test state, the self-test unit is configured to detect a level change at the first connection point.

In some embodiments, when the ground fault circuit interrupter is in the self-test state, the self-test unit operates according to the phase change of the current or voltage at the first connection point and the level change at the first connection point.

In some embodiments, the power supply lines 304 include a hot and a neutral in a two-phase AC power supply system, and the first terminal of the protection switch 302 is coupled with the hot.

In some embodiments, when being controlled to be conducted by the residual current protection control unit, the line where the protection switch 302 is located forms a current path from the hot to the neutral through a silicon controlled rectifier.

In some embodiments, one port of power supply lines 304 is coupled with the load, and the other port of the power supply lines 304 is coupled with the AC power supply system.

In some embodiments, when the current flowing through the protection switch 302 is higher than the preset power-off threshold, the protection switch 302 may disconnect the load from the AC power supply system to realize residual current protection.

In some embodiments, the residual current simulation unit 303 includes a first residual current simulation line, a second residual current simulation line and a third switch. A first terminal of the first residual current simulation line is coupled with the hot, and a second terminal of the first residual current simulation line is coupled with the second residual current simulation line at a second connection point. A first terminal of the second residual current simulation line is coupled with the neutral, and a second terminal of the second residual current simulation line is coupled with the first residual current simulation line at the second connection point. A first terminal of the third switch is coupled with the second connection point, a second terminal of the third switch is grounded, and a control terminal of the third switch is coupled with the self-test unit.

In some embodiments, when the ground fault circuit interrupter is in a self-test state, and a phase change of the current or voltage at the first connection point is detected, the self-test unit may control the third switch to be turned on, so that the simulated residual current is generated on the residual current simulation unit 303. When the residual current on the power supply lines 304 is in a positive half-cycle of an AC power signal, the self-test unit may control the first residual current simulation line to generate the simulated residual current; when the residual current on the power supply lines 304 is in a negative half-cycle of the AC power signal, the self-test unit may control the second residual current simulation line to generate the simulated residual current.

Figure 4:
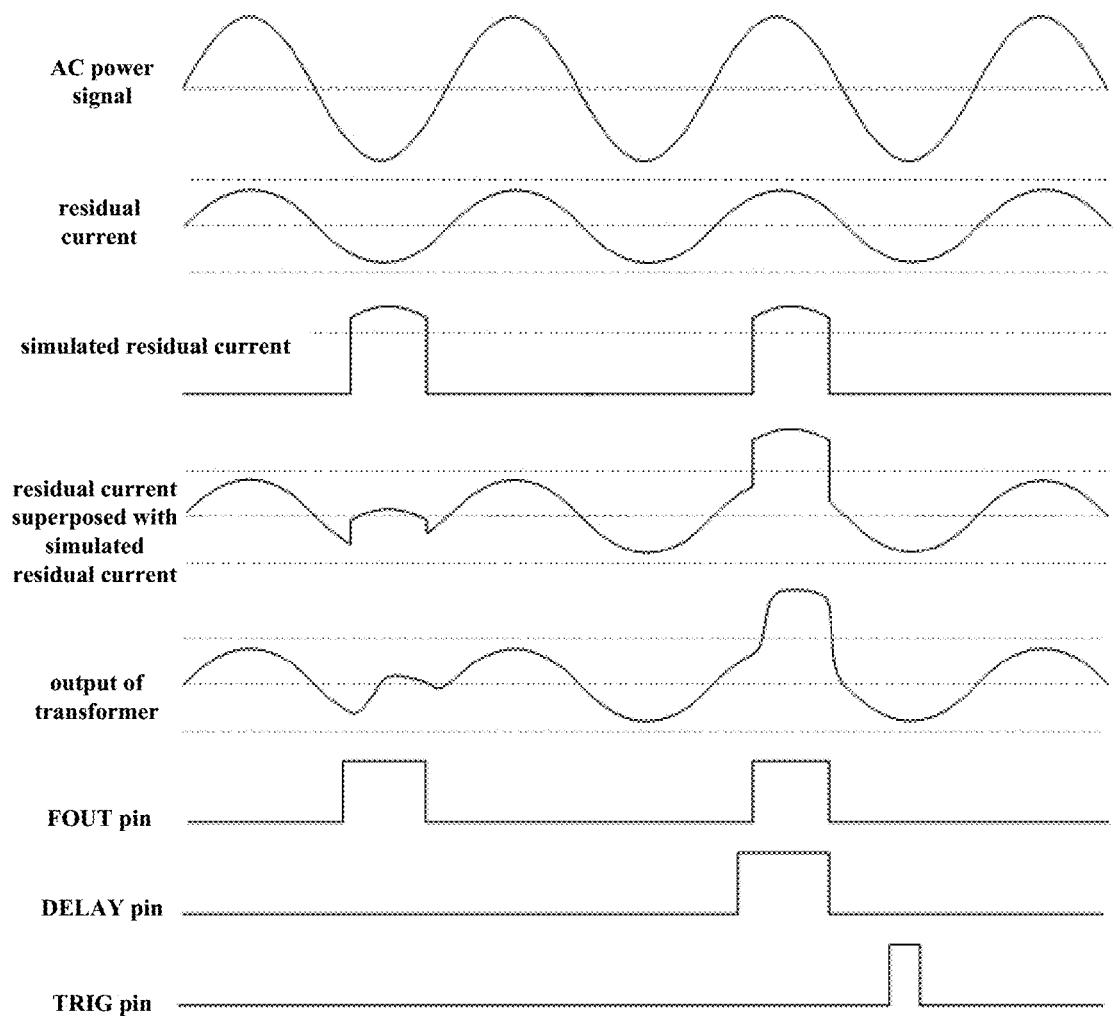
FIG. 4 schematically illustrates waveforms associated with the ground fault circuit interrupter as shown in FIG. 3.

Referring to FIG. 4, in some embodiments, if there is a small residual current on the power supply lines 304 due to imbalance of a sensing coil, in a self-test state, the self-test unit controls the second residual current simulation line to generate a simulated residual current on the neutral in a negative half-cycle of the AC power signal. The simulated residual current and the small residual current on the power supply lines 304 due to the imbalance of the sensing coil may have opposite directions, and cancel each other. Therefore, no residual current signal is generated on the transformer 301, or there is merely a residual current signal having intensity lower than the preset operating threshold.

In some embodiments, in a self-test state, the self-test unit controls the second residual current simulation line to generate a simulated residual current on the hot in a positive half-cycle of the AC power signal, and detects at the first connection point through the STIN pin. A DELAY pin of the self-test unit is pulled up to output a delay signal to the residual current protection control unit, and an FOUT pin is pulled up to control the third switch to be turned on, so that a simulated residual current is generated on the first residual current simulation line. The generated simulated residual current and the small residual current on the power supply lines 304 due to the imbalance of the sensing coil have the same direction, and are superimposed, so that a residual current signal can be generated on the transformer 301. After the residual current protection control unit receives the residual current signal being higher than the preset operating threshold, the residual current protection control unit controls the line where the protection switch 302 is located to be conducted by pulling the TRIG pin up after the preset protection time period due to the control of the delay signal and during a negative half-cycle of the residual current on the power supply lines 304. At this time, there is no current flowing through the line where the protection switch 302 is located, so that the protection switch 302 impossibly operates improperly.

In some embodiments, the preset protection time period may be set by users according to practical situations.

In some embodiments, the self-test unit may determine that a phase of the current or voltage on the first connection point changes when a zero-crossing point is detected on the phase of the current or voltage at the first connection point.

In some embodiments, if the self-test unit detects a phase change of the current or voltage at the first connection point, and the level becomes low during the self-test state, it is indicated that the function and the components of the ground fault circuit interrupter are normal.

In some embodiments, if the self-test unit does not detect a phase change of the current at the first connection point or does not detect that the first connection point changes from a logic high to a logic low in the self-test state, an ALARM pin of the self-test unit controls a light emitting diode to generate an alarm signal.

In some embodiments, a first diode is provided on the first residual current simulation line, a cathode of the first diode is coupled with the hot, and an anode of the first diode is coupled with the second connection point. A second diode is provided on the second residual current simulation line, a cathode of the second diode is coupled with the neutral, and an anode of the second diode is coupled with the second connection point.

In some embodiments, the diodes may isolate reverse current.

In some embodiments, the residual current simulation unit 303 further includes a resistor, a first terminal of the resistor is coupled with the second connection point, and a second terminal of the resistor is coupled with the first terminal of the third switch.

In some embodiments, a third diode is provided on the line where the protection switch 302 is located, a cathode of the third diode is coupled with the protection switch 302, and an anode of the third diode is coupled with the first connection point.

In some embodiments, the protection switch 302 is a tripping coil.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A ground fault circuit interrupter, comprising a transformer, a protection switch, a residual current protection control unit, a residual current simulation unit and a self-test unit,
    wherein a first terminal of the protection switch is coupled with power supply lines, and a second terminal of the protection switch is coupled with the residual current protection control unit and the self-test unit;
    the transformer is coupled with the residual current protection control unit, and configured to sense a residual current signal on the power supply lines and deliver the residual current signal to the residual current protection control unit;
    the residual current protection control unit is configured to control a line where the protection switch is located to be conducted when the residual current signal is higher than a preset operating threshold;
    the residual current simulation unit is coupled with the self-test unit;
    the self-test unit is coupled with the line where the protection switch is located; in a self-test state, the self-test unit is configured to control the residual current simulation unit to generate a simulated residual current, control the protection switch to be disconnected from the residual current protection control unit, and detect a change of a level on the line where the protection switch is located.

2. The ground fault circuit interrupter according to claim 1, further comprising a silicon controlled rectifier coupled with the protection switch, wherein a cathode of the silicon controlled rectifier is grounded, an anode of the silicon controlled rectifier is coupled with the second terminal of the protection switch, and a gate of the silicon controlled rectifier is coupled with the residual current protection control unit;
    wherein when the residual current signal received by the residual current protection control unit is higher than the preset operating threshold, a current or a voltage is applied to the gate of the silicon controlled rectifier to trigger the silicon controlled rectifier.

3. The ground fault circuit interrupter according to claim 2, wherein the self-test unit is coupled with the line where the protection switch is located at a first connection point, and configured to detect a phase change of a current or voltage at the first connection point, the first connection point is disposed between the silicon controlled rectifier and the protection switch, and in the self-test state, the self-test unit is configured to detect a change of a level at the first connection point.

4. The ground fault circuit interrupter according to claim 3, wherein the power supply lines comprise a hot and a neutral in a two-phase Alternating Current (AC) power supply system, and the first terminal of the protection switch is coupled with the hot.

5. The ground fault circuit interrupter according to claim 4, wherein the residual current simulation unit comprises a first residual current simulation line, a second residual current simulation line and a first switch;
  wherein a first terminal of the first residual current simulation line is coupled with the hot, and a second terminal of the first residual current simulation line is coupled with the second residual current simulation line at a second connection point;
  wherein a first terminal of the second residual current simulation line is coupled with the neutral, and a second terminal of the second residual current simulation line is coupled with the first residual current simulation line at the second connection point;
  wherein a first terminal of the first switch is coupled with the second connection point, a second terminal of the first switch is grounded, and a control terminal of the first switch is coupled with the self-test unit.

6. The ground fault circuit interrupter according to claim 5, wherein a first diode is provided on the first residual current simulation line, an anode of the first diode is coupled with the hot, and a cathode of the first diode is coupled with the second connection point; and
  a second diode is provided on the second residual current simulation line, an anode of the second diode is coupled with the neutral, and a cathode of the second diode is coupled with the second connection point.

7. The ground fault circuit interrupter according to claim 6, wherein the residual current simulation unit further comprises a resistor, a first terminal of the resistor is coupled with the second connection point, and a second terminal of the resistor is coupled with the first terminal of the first switch.

8. The ground fault circuit interrupter according to claim 6, further comprising a second switch, wherein a first terminal of the second switch is coupled with the second terminal of the protection switch, a second terminal of the second switch is coupled with the first connection point, and a control terminal of the second switch is coupled with the self-test unit.

9. The ground fault circuit interrupter according to claim 1, wherein the protection switch is a tripping coil.

10. A ground fault circuit interrupter, comprising: a transformer, a protection switch, a residual current protection control unit, a residual current simulation unit and a self-test unit,
  wherein a first terminal of the protection switch is coupled with power supply lines, and a second terminal of the protection switch is coupled with the residual current protection control unit and the self-test unit;
  the transformer is coupled with the residual current protection control unit, and configured to sense a residual current signal on the power supply lines and deliver the residual current signal to the residual current protection control unit;
  the residual current protection control unit is configured to control a line where the protection switch is located to be conducted when the residual current signal is higher than a preset operating threshold;
  the residual current simulation unit is coupled with the self-test unit;
  the self-test unit is coupled with the line where the protection switch is located; in a self-test state, the self-test unit is configured to control the residual current simulation unit to generate a simulated residual current, detect a change of a level on the line where the protection switch is located, and control the residual current protection control unit to make the line where the protection switch is located be conducted after a preset protection time period of receiving the residual current signal higher than the preset operating threshold.

11. The ground fault circuit interrupter according to claim 10, further comprising a silicon controlled rectifier coupled with the protection switch, wherein a cathode of the silicon controlled rectifier is grounded, an anode of the silicon controlled rectifier is coupled with the second terminal of the protection switch, and a gate of the silicon controlled rectifier is coupled with the residual current protection control unit;
  wherein when the residual current signal received by the residual current protection control unit is higher than the preset operating threshold, a current or a voltage is applied to the gate of the silicon controlled rectifier to trigger the silicon controlled rectifier.

12. The ground fault circuit interrupter according to claim 11, wherein the self-test unit is coupled with the line where the protection switch is located at a first connection point, and configured to detect a phase change of a current or voltage at the first connection point, the first connection point is disposed between the silicon controlled rectifier and the protection switch, and in the self-test state, the self-test unit is configured to detect a change of a level at the first connection point.

13. The ground fault circuit interrupter according to claim 12, wherein the power supply lines comprise a hot and a neutral in a two-phase Alternating Current (AC) power supply system, and the first terminal of the protection switch is coupled with the hot.

14. The ground fault circuit interrupter according to claim 13, wherein the residual current simulation unit comprises a first residual current simulation line, a second residual current simulation line and a third switch;
  wherein a first terminal of the first residual current simulation line is coupled with the hot, and a second terminal of the first residual current simulation line is coupled with the second residual current simulation line at a second connection point;
  wherein a first terminal of the second residual current simulation line is coupled with the neutral, and a second terminal of the second residual current simulation line is coupled with the first residual current simulation line at the second connection point;
  wherein a first terminal of the third switch is coupled with the second connection point, a second terminal of the third switch is grounded, and a control terminal of the third switch is coupled with the self-test unit.

15. The ground fault circuit interrupter according to claim 14, wherein a first diode is provided on the first residual current simulation line, an anode of the first diode is coupled with the hot, and a cathode of the first diode is coupled with the second connection point; and a second diode is provided on the second residual current simulation line, an anode of the second diode is coupled with the neutral, and a cathode of the second diode is coupled with the second connection point.

16. The ground fault circuit interrupter according to claim 14, wherein the residual current simulation unit further comprises a resistor, a first terminal of the resistor is coupled with the second connection point, and a second terminal of the resistor is coupled with the first terminal of the third switch.

17. The ground fault circuit interrupter according to claim 14, wherein a third diode is provided on the line where the protection switch is located, a cathode of the third diode is coupled with the protection switch, and an anode of the third diode is coupled with the first connection point.

18. The ground fault circuit interrupter according to claim 10, wherein the protection switch is a tripping coil.

\* \* \* \* \*